(12) United States Patent
LeBlanc (10) Patent No.: US 12,140,473 B2
(45) Date of Patent: Nov. 12, 2024

(54) MULTI-LAYER FIBER OPTIC CABLE WITH A CURED GELLING MATERIAL AND METHODS OF MAKING AND USING SAME

(71) Applicant: Halliburton Energy Services, Inc., Houston, TX (US)

(72) Inventor: Michel LeBlanc, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 160 days.

(21) Appl. No.: 17/589,164

(22) Filed: Jan. 31, 2022

(65) Prior Publication Data
US 2023/0243695 A1  Aug. 3, 2023

(51) Int. Cl.
| | |
|---|---|
| G02B 6/44 | (2006.01) |
| C08J 3/075 | (2006.01) |
| E21B 17/20 | (2006.01) |
| E21B 47/135 | (2012.01) |
| G01H 9/00 | (2006.01) |
| G01V 1/16 | (2006.01) |

(52) U.S. Cl.
CPC .............. *G01H 9/004* (2013.01); *C08J 3/075* (2013.01); *E21B 17/206* (2013.01); *E21B 47/135* (2020.05); *G01V 1/168* (2013.01); *G02B 6/4415* (2013.01); *C08J 2363/00* (2013.01); *C08J 2383/04* (2013.01); *C08J 2463/00* (2013.01); *C08J 2483/04* (2013.01); *G02B 6/44384* (2023.05)

(58) Field of Classification Search
CPC .................................................. G02B 6/4415
See application file for complete search history.

(56) References Cited

U.S. PATENT DOCUMENTS

| | | | | |
|---|---|---|---|---|
| 4,786,138 A | * | 11/1988 | Buckley ............... | G02B 6/4401 |
| | | | | 385/141 |
| 4,963,698 A | * | 10/1990 | Chang ................... | H02G 15/04 |
| | | | | 174/74 A |

(Continued)

FOREIGN PATENT DOCUMENTS

| | | |
|---|---|---|
| CA | 2858016 A1 | 6/2011 |
| JP | H0613705 B2 * | 2/1994 ............. Y02A 30/14 |

(Continued)

OTHER PUBLICATIONS

JP H0613705 B2 English translation (Year: 1994).*
JP H07302518 A English translation (Year: 1995).*
KR-20190126575-A English translation (Year: 2019).*

*Primary Examiner* — Charlie Y Peng
(74) *Attorney, Agent, or Firm* — Conley Rose, P.C.; Rodney B. Carroll (57) ABSTRACT

A fiber optic cable in the present disclosure comprises: an outer tube having an inner surface and an outer surface; a fiber in metal tube (FIMT) comprising one or more optical fibers, wherein the FIMT is disposed within the outer tube, and wherein the outer surface of the FIMT and the inner surface of the outer tube form an annular space; and a cured gelling material in the annular space. By incorporating the cured gelling material into the annular space, fluid migration through the annular space can be reduced, and sheer stress for strain coupling of the FIMT and the outer tube can be increased.

21 Claims, 5 Drawing Sheets

(56) References Cited

U.S. PATENT DOCUMENTS

| | | | | |
|---|---|---|---|---|
| 5,061,565 A * | 10/1991 | Aoki | ................... | B41N 1/245 |
| | | | | 101/127 |
| 6,493,491 B1 * | 12/2002 | Shen | ................... | G02B 6/4433 |
| | | | | 385/100 |
| 6,907,170 B1 | 6/2005 | Maida, Jr. | | |
| 7,218,820 B2 | 5/2007 | Maida, Jr. | | |
| 7,400,803 B2 | 7/2008 | Maida, Jr. | | |
| 2002/0076177 A1 * | 6/2002 | Bonja | ................ | G02B 6/4427 |
| | | | | 385/106 |
| 2005/0101693 A1 * | 5/2005 | Arbogast | ............. | A61F 2/5046 |
| | | | | 623/36 |
| 2005/0154100 A1 * | 7/2005 | Kosaka | ................. | C08L 23/02 |
| | | | | 524/115 |
| 2014/0212609 A1 | 7/2014 | Stratton et al. | | |
| 2016/0116331 A1 * | 4/2016 | Taverner | ............ | G02B 6/02395 |
| | | | | 385/13 |
| 2016/0369058 A1 * | 12/2016 | Zhang | ................... | A61Q 1/08 |

FOREIGN PATENT DOCUMENTS

| | | | | |
|---|---|---|---|---|
| JP | H07302518 A * | 11/1995 | ........... | G02B 6/4423 |
| KR | 20190126575 A * | 11/2019 | ............... | C09K 3/18 |

* cited by examiner

MULTI-LAYER FIBER OPTIC CABLE WITH A CURED GELLING MATERIAL AND METHODS OF MAKING AND USING SAME

FIELD

This disclosure relates generally to fiber optic cables. More specifically, it relates to fiber optic cables that can be used in a wellbore penetrating a subterranean formation.

BACKGROUND

Hydrocarbons, such as oil and gas, are often produced from wells that penetrate hydrocarbon-bearing subterranean formations or portions thereof. The development of subterranean operations and the processes involved in removing hydrocarbons from a subterranean formation are complex. Typically, subterranean operations involve a number of different steps such as, for example, drilling a borehole or a wellbore at a desired well site, treating the borehole or wellbore to optimize production of hydrocarbons, and performing the necessary steps to produce and process the hydrocarbons from the subterranean formation. The terms borehole or wellbore may be used interchangeably throughout the present disclosure.

Certain sensing systems (such as a distributed acoustic sensing (DAS) system) include measurement and logging devices or various tools that generate, receive, or detect data and information from distant locations. For example, DAS systems may utilize fiber optic cables as a sensing element and downhole data and information is measured by an attached information handling system. This data and information may, for instance, relate to the physical condition of a sensing system, the characteristics of a subterranean formation surrounding the borehole or sensing system, and proximate or surrounding temperature, acoustics, vibrations, or movement. A sensing system may transmit the data and information from the sensing system to information handling systems positioned at remote locations, for example, at a surface location associated with a borehole or a command center. Fluids such as hydrocarbon fluids, aqueous fluids, and $CO_2$, can be around a portion of the fiber optic cables, enter the fiber optic cable if the cable outer armor layer is damaged. Such migration is highly undesirable. Fluid migration through the fiber optic cable can present a health hazard to surface personnel, cause a fire, or harm the environment. Additionally, strain coupling of layers in a fiber optic cable can play an important role in quality of signals transmitted through the fiber optic cable.

Therefore, an ongoing need exists for fiber optic cables that prevent fluid migration and have improved strain coupling.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a fiber optic cable and methods of making and using the same. In embodiments, the fiber optic cable involves a cured gelling material. The fiber optic cable can be used in a distributed acoustic sensing (DAS) system. The DAS system can be used in a wellbore penetrating at least a portion of a subterranean formation (also referred to as a formation hereinafter).

Figure 1:
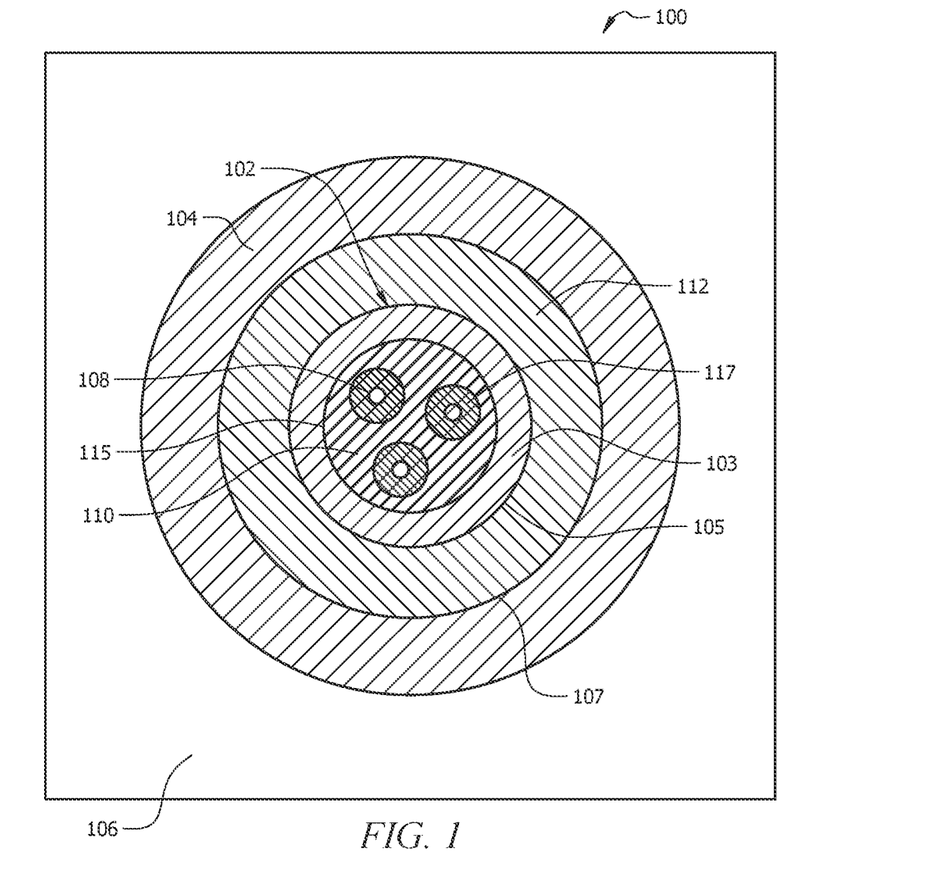
FIG. 1 is a cross-sectional view according to some embodiments of the disclosure.
Figure 2:
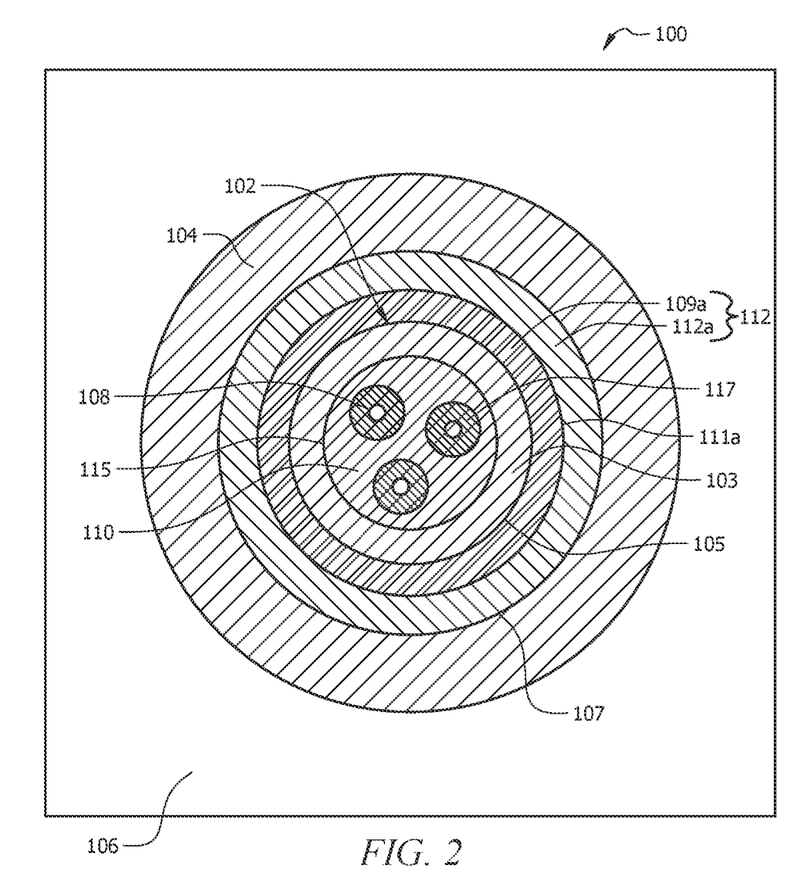
FIG. 2 is a cross-sectional view according to some embodiments of the disclosure.
Figure 3:
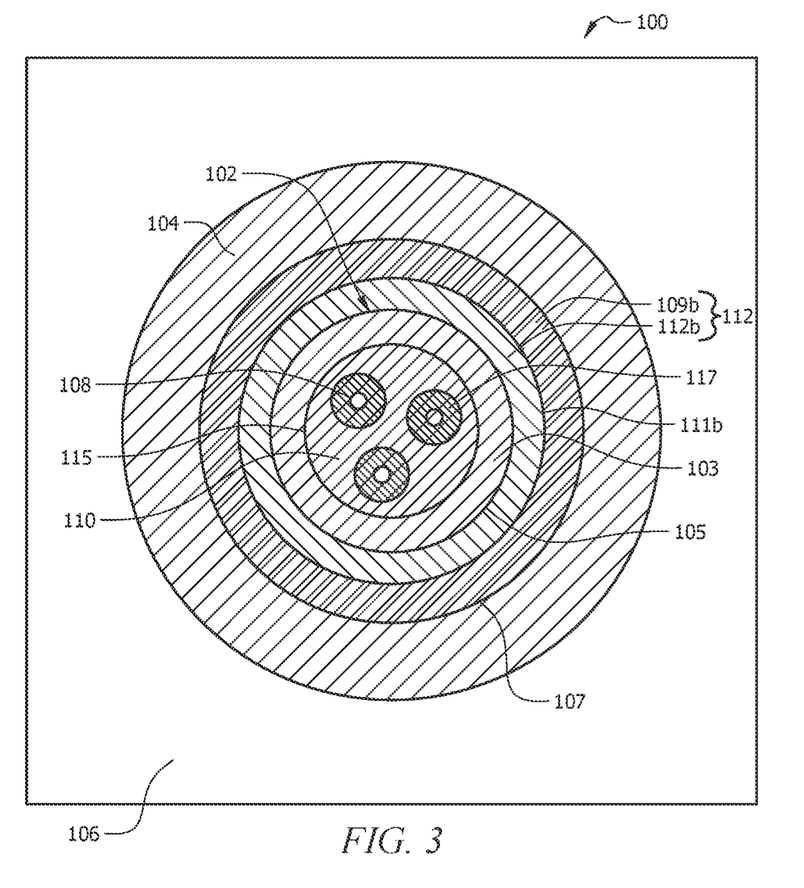
FIG. 3 is a cross-sectional view according to some embodiments of the disclosure.

FIGS. 1-3 are cross-sectional views of a fiber optic cable 100 according to some embodiments of the present disclosure. Particular examples and dimensions specified throughout this document are intended for exemplary purposes only and are not intended to limit the scope of the present disclosure. Moreover, the illustrations in FIGS. 1-3 are not intended to be to scale. In FIGS. 1-3, an axial direction is a direction perpendicular to the cross-section.

In embodiments, referring to FIG. 1, the fiber optic cable 100 comprises an outer tube 104 (also termed an "armor layer") having an inner surface 107 and an outer surface, a fiber in metal tube (FIMT) 102, and a cured gelling material. The FIMT 102 can be disposed within the outer tube 104 and can comprise one or more optical fibers 108. In embodiments, the outer surface 105 of the FIMT 102 and the inner surface 107 of the outer tube 104 form an annular space 112. The cured gelling material can be disposed within the annular space 112. A "tube" in the present disclosure is defined as having a bore or hollow space extending the length thereof. A tube can be filled with other components, such as other tubes, optical fibers, and polymer materials (also denoted as "belt layers"). Unless explicitly specified otherwise, the cross-section of outer and/or inner surfaces of the outer tube 104, the FIMT 102, the one or more optical fibers 108, and other tubes in the present disclosure can have a round shape as depicted in FIGS. 1-3, or any other suitable shapes, for example, oval, elliptical, square, rectangular, triangular, etc.

In embodiments, the cured gelling material of fiber optic cable 100 comprises a biopolymer (e.g., polysaccharides), a synthetic polymer (e.g., polysiloxane, polyacrylamide, polyacrylate, polyacrylamide copolymers, and polyacrylate copolymers), or combinations thereof. In some embodiments, the cured gelling material comprises a silicone component, an epoxy resin, polyurethanes (PUs), thermoplastic polyurethanes (TPUs), thermoplastic vulcanizates (TPVs), polyether ester block copolymers (COPEs), thermoplastic polyamides (COPAs), silicone containing thermoplastic elastomers, fluorine containing thermoplastic elastomers, phenolics, cyanate ester based resins, high temperature resistant thermoplastics, polyetherimides, polyphenylene ether, polyoxyphenylenes, polysulphone, syndiotactic polystyrene, polyaryl ether ketones, polycarbonates, acetals, polyimides, polyarylene sulfides, polyurethane based compositions, natural rubber, ethylene/propylene (EPM) copolymers, ethylene/propylene/diene (EPDM) copolymers, styrene/butadiene copolymers, chlorinated polyethylene, vinylic resins, cycloaliphatic epoxy resins, nitrogen containing resins such as cyanate ester based resins, or combinations thereof. In some embodiments, the cured gelling material comprises a silicone component, an epoxy resin, or a combination thereof. The cured gelling material may include a silicone oil to reduce the elastic modulus of the cured gelling material.

The cured gelling material can be crosslinked. Crosslinking refers to a procedure to connect units between neighboring chains of atoms in a complex chemical molecule (e.g., a polymer, a biopolymer such as a starch) and/or between molecules. The connecting can be in the form of any bond, for example, covalent bond, ionic bond, and the like.

The silicone component can include polymeric organosilicon compounds, also referred to as polysiloxane, such as polydimethylsiloxane (PDMS). The silicone component can include silicone oil, silicone grease, silicone rubber, silicone resin, silicone caulk, or combinations thereof. In embodiments, the silicone component in the cured gelling material comprises a silicone resin. The silicone component can comprise two or more silicone reactive moieties independently selected from the group consisting of epoxy, hydroxy, olefinic, hydride, isocyanate, acrylate, acetoxy, enoxy, oxime, alkoxy, amine, amide groups, derivatives thereof, and combinations thereof. In embodiments, the silicone component has a weight average molecular weight of from about 1,000 to about 10,000, alternatively from about 1,000 to about 9,000, alternatively from about 1,000 to about 8,000, or alternatively from about 2,000 to about 8,000. In some embodiments, the silicone component is in the cured gelling material in an amount of from about 0.1 wt. % to about 99.9 wt. %, alternatively from about 1 wt. % to about 99 wt. %, or alternatively from about 9 wt. % to about 91 wt. %.

In embodiments, the cured gelling material comprises an epoxy resin. Epoxy resins, are a class of reactive prepolymers and polymers which contain epoxide groups, which are also collectively called epoxy. The epoxy resin can comprise two or more epoxy reactive moieties independently selected from the group consisting of epoxide, oxirane, ethylene carbonate, alcohol, amine, derivatives thereof, and combinations thereof. Epoxy resins may include mono-functional epoxy resins, multi- or poly-functional epoxy resins, or combinations thereof. In embodiments, the epoxy resin has a weight average molecular weight of from about 100 to about 10,000, alternatively from about 200 to about 7,500, alternatively from about 300 to about 5,000, or alternatively from about 300 to about 2,500. In some embodiments, the epoxy resin is in the cured gelling material in an amount of from about 0.1 wt. % to about 99.9 wt. %, alternatively from about 1 wt. % to about 99 wt. %, or alternatively from about 9 wt. % to about 91 wt. %.

In embodiments, the cured gelling material is cured from a gelling material comprising two or more reactive groups and a catalyst. The gelling material can be in the form of a fluid such as a liquid. The two or more reactive groups can include the two or more silicone reactive moieties and/or the two or more epoxy reactive moieties as disclosed hereinabove. The two or more reactive groups can be present in the gelling material in an amount of from about 50 wt. % to about 99.99 wt. %, alternatively from about 75 wt. % to about 99 wt. %, alternatively from about 85 wt. % to about 98.5 wt. %, or alternatively from about 90 wt. % to about 98 wt. %, based on the total weight of the gelling material. The catalyst can comprise tin compounds, platinum, rhodium compounds, titanium compounds, peroxides, an imidazole amine, a tertiary amine, tetraalkylphosphonium salts, tetraalkylammonium salts, benzyl dimethylamine, dimethyl aminomethyl phenol, amines (such as triethylamine), imadazole derivatives, and the like, or combinations thereof. The catalyst can be used to control the rate and extent of reactions such as crosslinking. Crosslinking can occur before or during curing. In some embodiments, the gelling material further comprises at least one of a hardener, an inorganic filler, a fibrous reinforcement, a high temperature resistant thermoplastic resin, and a solvent. Hardeners and curing agents may be provided for promoting the curing. For example, a hardener or curing agent may be provided for promoting crosslinking. The hardeners and curing agents described herein may be used individually or as a mixture of two or more. Nonlimiting examples of suitable curing agents may include primary and secondary polyamines and their adducts, anhydrides, and polyamides. Nonlimiting examples of suitable hardeners may include phenol novolac hardener, cresol novolac hardener, dicyclopentadiene phenol hardener, limonene type hardener, anhydrides, and mixtures thereof.

In some embodiments, the gelling material further comprises additives. The additives can include toughening agents, wetting agents, processing aids, UV blocking compounds, fluorescent compounds, silica, glass, talc, quartz, metal powders, titanium dioxide, pigments, coloring agents, mold release agents, coupling agents, flame retardants, ion scavengers, UV stabilizers, flexibilizing agents, tackifying agents, or combinations thereof. The additives may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, stabilizers, and/or others. Additionally, these additives may have an effect on the properties of the gelling material, before and/or after curing, and should be taken into account when formulating the gelling material.

In embodiments, preparing a gelling material comprises contacting components of the gelling material (e.g., the two or more reactive groups and the catalyst). The contacting can be in a suitable container (e.g., a mixer, a blender) at a reaction temperature of from about 30° F. to about 350° F., alternatively from about 45° F. to about 300° F., or alternatively from about 50° F. to about 250° F. In some embodiments, the contacting is under ultraviolet (UV) radiation.

Without being limited by theory, the UV radiation can activate the curing and/or increase the rate of the curing.

In embodiments, preparing the gelling material further comprises blending the components of the gelling material. A blender or mixer can be used for blending/mixing. In embodiments, the gelling material further comprises a retarder. The retarder can be used for delaying curing of the gelling material. The retarder can comprise any suitable material. Examples of suitable retarders include, but are not limited to a phosphonic acid, a phosphonic acid derivative, a lignosulfonate, a salt, an organic acid, a carboxymethylated hydroxyethylated cellulose, a synthetic co- or terpolymer comprising sulfonate and carboxylic acid groups, a borate compound, and derivatives thereof. Effective amounts of each component may be determined to meet one or more user or process goals.

In embodiments, the gelling material comprises a silicone component. In such embodiments, the gelling material can be provided in a solution form. If so, suitable solvents may include, but are not limited to, crude oil, petroleum distillates, alcohol, butyl alcohol, isopropyl alcohol, a heavy aromatic solvent, xylene, toluene, heavy aromatic naphtha, mutual solvents, ethylene glycol monobutyl ether, propylene carbonate, n-methylpyrrolidone, and derivatives or combinations thereof.

The gelling material may also be blended with reactive or non-reactive diluents if desired. In both cases, the diluents may serve to reduce the viscosity of the composition at the time of mixing or placement, modify the rheology of the gelling material, and/or reduce the cost. The reactive diluents may contain reactive moieties, for example, epoxide or hydroxyl groups, that are capable of reacting with the two or more reactive groups in the presence or absence of the catalyst. Reactive diluents may not crosslink by themselves even when used in combination with suitable catalysts but may become part of the cured gelling material when used in combination with the two or more reactive groups. Examples of reactive moieties that reactive diluents may contain include, without limitation, epoxide, isocyanate, an ester, a carboxylic anhydride, a halide, or an olefin. They may also serve to control the degree of curing and elasticity by acting as polymerization chain transferring or chain terminating agents. Non-reactive diluents may be silicone or non-silicone based. They may be any liquid hydrocarbon that is miscible with the two or more reactive groups and does not detrimentally interfere with the curing process. In an embodiment, the diluent is a tackifying material. Non-limiting examples of diluents include petroleum derived oils, alkylphosphates, aliphatic liquid polymers, for example polyisobutylenes, non-functionalized liquid polybutadienes.

In embodiments, the gelling material is provided in two or more parts (e.g., in a form of a two-part gel) for storage. When preparing the gelling material, the two or more parts can be blended at any suitable mixing ratio. In embodiments, the mixing ratio of any of the two or more parts is from about 1000:1 to about 1:1000 by weight, alternatively from about 100:1 to about 1:100, or alternatively from about 10:1 to about 1:10. Nonlimiting examples of suitable gelling material include SilGel® 613 silicone gel, SilGel® 612 silicone gel, and ElastoSil® CAT PT silicone product, commercially available from Wacker Chemie AG.

After being prepared, the gelling material can be allowed to cure to form the cured gelling material. Curing time of the gelling material can be from about 1 minute to about 48 hours at about 74° F., alternatively from about 5 minutes to about 24 hours, or alternatively from about 10 minutes to about 15 hours. Formulations of the gelling material may also be selected such that curing is delayed and occurs once the fiber optic cable 100 is downhole at an elevated temperature such as above 140° F. The curing time downhole may be about 1 day to about 50 days. The curing time herein refers to the period of time from initial contact of the components to the point when a gel is formed. In embodiments, the curing time of the gelling material is from about 1 hour to about 48 hours at about 74° F., alternatively from about 1 hour to about 24 hours, or alternatively from about 2 hours to about 15 hours. In some embodiments, the curing occurs when temperature round the fiber optic cable 100 is above a threshold temperature such that the curing takes place after the fiber optic cable 100 is deployed in the wellbore. The threshold temperature can be about 120° F. to about 140° F., alternatively about 140° F. to about 160° F., or alternatively about 160° F. to about 200° F. The curing time can be adjusted so as to meet some user and/or process-desired need. In embodiments, the cured gelling material is in a form of gel. As used herein, a gel is defined as a crosslinked polymer network swollen in a liquid medium. The gel can have a viscoelastic or semi-solid, jelly-like state. The gel can be an elastic gel, which qualitatively refers to a gel that is elastically deformable and may be flowable. The strength of the gel formed can depend on a variety of factors such as the concentration of the reactants.

In embodiments, the storage modulus (also referred to as elastic shear modulus) of the cured gelling material at about 75° F. is from about 5 kPa to about 300 kPa, alternatively from about 5 kPa to about 200 kPa, alternatively from about 5 kPa to about 150 kPa, alternatively from about 5 kPa to about 100 kPa, or alternatively from about 5 kPa to about 50 kPa.

In embodiments, the viscosity of the gelling material (i.e., the cured gelling material before curing) at about 75° F. is equal to or less than about 50,000 cp, alternatively equal to or less than about 10,000 cp, alternatively equal to or less than about 5,000 cp, alternatively equal to or less than about 4,000 cp, alternatively equal to or less than about 3,500 cp, or alternatively from about 100 cp to about 3,000 cp. The viscosity can be measured in accordance with test standard DIN EN ISO 3219.

In embodiments, the cured gelling material is a thermally stable gel at a temperature ranging from about 50° F. to about 450° F., alternatively from about 50° F. to about 400° F., or alternatively from about 50° F. to about 350° F. Herein a thermally stable gel refers to a gel that resists solution expulsion accompanied by gel volume reduction, or disintegration of the gel to a thin solution of viscosity less than that of the gel at elevated temperatures, such as 350° F.

In embodiments, the dielectric constant of the cured gelling material is from about 2 to about 3.5, alternatively from about 2.5 to about 3.5, or alternatively from about 2.5 to about 3.25, at about 20 Hz to about 100 kHz and about 70° F. to about 300° F.

In embodiments, the hardness penetration of the cured gelling material is from about 30 mm/10 to about 80 mm/10, alternatively from about 35 mm/10 to about 70 mm/10, alternatively from about 40 mm/10 to about 70 mm/10. The hardness penetration can be measured by a penetrometer.

In embodiments, the specific density of the cured gelling material is from about 0.8 g/cm$^3$ to about 2.0 g/cm$^3$, alternatively from about 0.95 g/cm$^3$ to about 1.05 g/cm$^3$, alternatively from about 0.96 to about 1.00, alternatively from about 0.97 to about 0.99.

In embodiments, the thermal conductivity of the cured gelling material is from about 0.1 W/mK to about 7 W/mK, alternatively from about 0.1 W/mK to about 3 W/mK, alternatively from about 0.1 W/mK to about 0.4 W/mK, or alternatively from about 0.1 W/mK to about 0.3 W/mK.

In embodiments, the linear thermal expansion coefficient of the cured gelling material is from about 2E-5 m/mK to about 8E-4 m/mK, alternatively from about 2E-5 m/mK to about 6E-4 m/mK, alternatively from about 5E-5 m/mK to about 4E-4 m/mK, or alternatively from about 1E-4 m/mK to about 4E-4 m/mK.

The annular space 112 of the fiber optic cable 100 can have any suitable thickness. The thickness herein is defined as a distance between two surfaces (e.g., the outer surface 105 of the FIMT 102 and the inner surface 107 of the outer tube 104) that form a part or a space of the fiber optic cable 100 along a radical direction. In embodiments, the annular space 112 of the fiber optic cable 100 has a thickness of from about 0.001 inch to about 1 inch, alternatively from about 0.01 inch to about 0.5 inch, or alternatively from about 0.01 inch to about 0.25 inch. Fill percentage of the cured gelling material can be from about 25% to about 100% based on the total volume of the annular space 112, alternatively from about 40% to about 100%, alternatively from about 50% to about 100%, or alternatively from about 75% to about 100%.

In embodiments, a fluid comprising $CO_2$, $H_2$, $H_2O$, $N_2$, $O_2$, CO, $NH_3$, $H_2S$, $SO_2$, hydrocarbon, or combinations thereof is in contact with at least a portion of the fiber optic cable. For example, when an end of the fiber optic cable 100 is disposed in a wellbore comprising a $CO_2$ capture and/or storage zone, $CO_2$ can be around a portion of the fiber optic cable 100. When there is a path (e.g., when there is a breach of the outer tube 104) from the environment to the annular space 112, a flow of the fluid can enter the annular space 112 and thus contacting the cured gelling material and exerting a fluid pressure on the cured gelling material. Under the fluid pressure, the cured gelling material can move (e.g., slide) in the annular space 112 along the fiber optic cable 100. In embodiments, at least a portion of the shear stress exerted by the cured gelling material is due to movement of the cured gel material. Herein shear stress refers to the component of stress coplanar with a material cross section and can be cumulative. In some embodiments, the shear stress accumulated by the movement of the cured gelling material is sufficient to reduce or cease movement of the cured gelling material. For example, the cured gelling material may have reduced or cease movement after travelling over a distance of equal to or less than about 50 ft along the axial direction. The flow of the fluid through the annular space 112 can also cease or be reduced over a distance of equal to or less than about 50 ft along an axial direction, alternatively over a distance of equal to or less than about 40 ft, alternatively over a distance of equal to or less than about 30 ft, alternatively over a distance of equal to or less than about 20 ft, or alternatively over a distance of equal to or less than about 10 ft. In some embodiments, wellbores are 10,000 ft or more in length, reducing or ceasing the flow of the fluid over a distance of 50 ft offers protection from fluids migrating along the fiber optic cable 100 all the way to the surface of the wellbore.

In addition, the cured gelling material in the annular space 112 can reduce or prevent relative motion of the FIMT 102 with respect to the outer tube 104. The FIMT 102 can comprise one or more optical fibers 108, thus a motion of the FIMT 102 relative to the outer tube 104 may amount to shift in the sensing position of the one or more optical fibers 108 relative to the wellbore environment, which affects the positional accuracy of a measurement. Also, some applications of the fiber optic cable 100 in a wellbore involve measurements of wellbore strain, and coupling between the wellbore and the one or more optical fibers 108 occurs via shear stress transmitted across interfaces. Relative motion (e.g., slippage) of the inner FIMT 102 relative to the outer tube 104 may cause that the strain profile measured by the one or more optical fibers 108 is not the same as that in the wellbore. Having a cured gelling material in the annular space 112 between the outer tube 104 and the FIMT 102 provides a medium through which interfacial shear stress is transmitted and provides additional strain coupling between the outer tube 104 and the FIMT 102. Without the cured gelling material, the interfacial shear stress available includes friction at contact locations (e.g., contact points) between the outer surface 105 of the FIMT 102 and the inner surface 107 of the outer tube 104. Those contact locations are random and can be separated by distances that are large enough to affect the spatial resolution and accuracy of the measured wellbore strain.

Herein strain coupling refers to capability to transfer at least a portion of strain between two layers of the fiber optic cable 100. For example, strain coupling of the FIMT 102 and the outer tube 104 refers to that at least a portion of strain in the FIMT 102 can be imparted to the outer tube 104, and at least a portion of strain in the outer tube 104 can be imparted to the FIMT 102. Improved strain coupling means that an increased portion of strain can be transferred between two layers of the fiber optic cable 100. Improved strain coupling can improve signal quality for strain-based applications, such as strain sensing for regular DAS acquisition and cross-well strain sensing.

The ratio of the length of the fiber optic cable 100 to the outside diameter (OD) of the annular space 112 can be any suitable ratio, for example, equal to or greater than about 10,000, alternatively equal to or greater than about 150,000, or alternatively equal to or greater than about 1,000,000. The ratio of the length of the fiber optic cable 100 to the inside diameter (ID) of the annular space 112 can be any suitable ratio, for example, equal to or greater than about 10,000, alternatively equal to or greater than about 150,000, or alternatively equal to or greater than about 1,000,0000. In embodiments, a component of the shear stress is provided by an internal friction provided by the cured gelling material, the friction between the cured gelling material and the FIMT 102, the friction between the cured gelling material and the outer tube 104, or combinations thereof. An internal friction herein is defined as frictional interaction between adjacent portions in the interior of a substance (e.g., the cured gelling material) due to various causes such as viscous deformation or flow. In embodiments, a sheer stress provided by the internal friction provided by the cured gelling material is greater than shear stress provided by the frictions (e.g., the friction between the cured gelling material and the FIMT 102, the friction between the cured gelling material and the outer tube 104). In embodiments, the sheer stress provided by the internal friction provided by the cured gelling material is from about 1 to about 1,000 times of the sheer stress provided by the frictions, alternatively from about 1 to about 500 times, or alternatively from about 1 to about 100 times.

In various embodiments, the cured gelling material is capable of improving strain profiles obtained using the fiber optic cable 100 in an observation wellbore during hydraulic fracturing operations occurring in a nearby wellbore (e.g., a treatment well). Such cross-well strain profile may use low-frequency distributed acoustic sensing (LF-DAS) and the increased strain coupling due to the cured gelling material can result in a more sensitive detection of approach fractures from the treatment well. In other embodiments, the cured gelling material is capable of improving (e.g., increasing strength and/or quality of a signal) the strain signals detected in an observation well caused by the propagation of seismic waves generated by microseismic events occurring during the hydraulic fracturing of a nearby well. The improvement can be manifested as the ability to detect a lower amplitude strain signal generated in the wellbore and to measure it with greater fidelity.

In embodiments, referring to FIGS. 1-3, the fiber optic cable 100 comprises a FIMT 102. The FIMT 102 can have any suitable outside diameter (OD), for example, from about 0.01 inch to about 2.5 inches, alternatively from about 0.01 inch to about 2 inches, alternatively from about 0.01 inch to about 1 inch, or alternatively from about 0.01 inch to about 0.25 inch. In embodiments, as depicted in FIGS. 1-3, the FIMT 102 further comprises an inner tube 103 having an inner surface 115, wherein the one or more optical fibers 108 are disposed within the inner tube 103. In some embodiments, although not depicted herein, the fiber optic cable 100 further comprises an aluminum layer disposed on the outer surface 105 of the FIMT 102.

In embodiments, the inner tube 103 operates as a hydrostatic pressure boundary for the fiber optic cable 100. That is, the inner tube 103 can be capable of withstanding relatively high differential pressures (e.g., greater than 50 psi) between an environment within the inner tube 103 and an environment external to the inner tube 103. The inner tube 103 can comprise any suitable material such as a corrosion resistant metal alloy. In embodiments, the inner tube 103 comprises a conductor, such as a metal or an alloy. In embodiments, the inner tube 103 comprises a material comprising stainless steel, copper, aluminum, Inconel® alloy, incoloy® alloy, or combinations thereof. Inconel® is a registered trademark of Special Metals Corporation for a family of austenitic nickel-chromium-based superalloys. Incoloy® alloy refers to a range of superalloys now produced by the Special Metals Corporation group of companies and created with a trademark by the Inco company in 1952. In embodiments, the inner tube 103 comprises a stainless steel micro-tube having approximately a 1/16-inch diameter and a 0.005-inch wall thickness. Although this example includes a diameter of 1/16-inch and a wall thickness of 0.005-inch, any other selected diameter and wall thickness may be used without departing from the scope of the present disclosure. Moreover, the selected diameter and wall thickness of the inner tube 103 may vary over the length of the fiber optic cable 100 depending upon the material selected. The inner tube 103 can have a thickness of from about 0.0001 inch to about 1 inch, alternatively from about 0.001 inch to about 0.5 inch, or alternatively from about 0.002 inch to about 0.1 inch.

In embodiments, the one or more optical fibers 108 are disposed within the inner tube 103. The one or more optical fibers 108 can comprise, for example, a single mode optical fiber, a multi-mode optical fiber, or a combination of these or other fiber types. In one particular example, the one or more optical fibers 108 comprise 50/125 µm Graded Index MultiMode fibers manufactured by SUMITOMO, 10/125 µm Pure Core Step Index Single-Mode fiber manufactured by SUMITOMO, or both. Although the examples in FIGS. 1-3 include three optical fibers 108, any number of the one or more optical fibers 108 may be used without departing from the scope of the present disclosure. The number of the one or more optical fibers 108 can be from 1 to about 10,000, alternatively from about 1 to about 5,000, alternatively from about 1 to about 1,000, alternatively from about 1 to about 500, alternatively from about 1 to about 100, or alternatively from about 1 to about 4. The one or more optical fibers 108 can have any suitable OD. In embodiments, the one or more optical fibers 108 has an OD of from about 10 micrometer (µm) to about 2,000 µm, alternatively from about 20 µm to about 500 µm, or alternatively from about 20 µm to about 300 µm.

In embodiments, the FIMT 102 further comprises an inner filler material 110 disposed between the outer surfaces of the one or more optical fibers 108 and the inner surface 115 of the inner tube 103. The inner filler material 110 can substantially encapsulate the one or more optical fibers 108. Herein "substantially encapsulating" is defined as encapsulating equal to or greater than 50% of a surface, e.g., the outer surface of the one or more optical fibers 108. In embodiments, at least a portion of a surface of the inner filler material 110 is in contact with and adheres to at least a portion of an outer surface of the one or more optical fibers 108 and/or the inner surface 115 of the inner tube 103 through an internal friction. In some embodiments, the inner filler material 110 operates to support the one or more optical fibers 108 and/or minimize vibration.

The inner filler material 110 can comprise any suitable filler material. In embodiments, the inner filler material 110 comprises a thixotropic gel, a hydrophobic gel, a hydrogen scavenging gel, grease compounds, foams, a cured gel, or combinations thereof. The inner filler material 110 can comprise a hydrogen scavenging or hydrogen absorptive material. One example of suitable hydrogen scavenging or hydrogen absorptive material is Sepigel™ H200 LWT hydrogen scavenging gel, commercially available from Seppic Inc. Using a hydrogen scavenging or hydrogen absorptive material within the fiber optic cable 100 allows the fiber optic cable 100 to alleviate hydrogen degradation of the one or more optical fibers 108 for hydrogen generated within the fiber optic cable 100. Moreover, implementing a hydrogen scavenging or hydrogen absorptive material within the inner filler material 110 can create a hydrogen barrier for hydrogen entered from the environment around the fiber optic cable 100. In embodiments, the inner filler material 110 comprises a material for protection against abrasion, such as LA1000 gel, commercially available from Info-Gel, LLC. In some embodiments, the inner filler material 110 comprises the same material as the cured gelling material. The cured gelling material as the inner filler material 110 can assist in strain coupling of the one or more optical fibers 108 and the inner tube 103.

In embodiments, the inner filler material 110 is capable of substantially filling any void spaces (e.g., filling at least 50% of the void spaces) within the inner tube 103. In embodiments, fill percentage of the inner filler material 110 is from about 50% to about 100%, alternatively from about 60% to about 100%, alternatively from about 70% to about 100%, or alternatively from about 80% to about 100%, based on the total volume of the space between the outer surfaces of the one or more optical fibers 108 and the inner surface 115 of the inner tube 103.

In embodiments, the FIMT 102 further comprises optical fiber buffers 117 disposed within the inner tube 103 and outwardly from the one or more optical fibers 108 as depicted in FIGS. 1-3. In an example, the optical fiber buffers 117 comprise 400 µm OD of silicon and 700 µm OD of Teflon FEP. Although silicon and Teflon are used in this example, any other optical fiber buffer materials may be used without departing from the scope of the present disclosure.

The fiber optic cable 100 can comprise an outer tube 104 as depicted in FIGS. 1-3. The outer tube 104 can comprise any suitable material such as a corrosion resistant metal alloy. In embodiments, the outer tube 104 comprises a material comprising stainless steel, copper, aluminum, Inconel® alloy, incoloy® alloy, or combinations thereof. In embodiments, the outer tube 104 comprises an Inconel® A825 tube having a ¼-inch diameter and a 0.035-inch wall thickness. Although this example includes a diameter of ¼-inch and a wall thickness of 0.035-inch, any other selected diameter and wall thickness may be used without departing from the scope of the present disclosure. Moreover, the selected diameter and wall thickness of the outer tube 104 may vary over the length of the fiber optic cable 100 depending upon the material selected. In embodiments, the outer tube 104 has an inner diameter (ID) in a range of from about 0.001 inch to about 3 inches, alternatively from about 0.01 inch to about 2.5 inches, alternatively from about 0.01 inch to about 2 inches, or alternatively from about 0.01 inch to about 0.5 inch. In embodiments, the outer tube 104 has a thickness of from about 0.001 inch to about 1 inch, alternatively from about 0.001 inch to about 0.4 inch, alternatively from about 0.001 inch to about 0.1 inch, or alternatively from about 0.001 inch to about 0.05 inch.

In embodiments, the fiber optic cable 100 further comprises an encapsulation 106 outwardly from the outer tube 104. The encapsulation 106 can substantially encapsulate the outer tube 104. In embodiments, the encapsulation 106 operates to protect the materials of the fiber optic cable 100 during handling and installation. The cross-section of the encapsulation 106 (shown as square in in FIG. 1) can have any suitable shape, for example, round, oval, elliptical, square, rectangular, triangular, etc. The encapsulation 106 can comprise any suitable material. In embodiments, the encapsulation 106 comprises a thermoplastic elastomer. The thermoplastic elastomer can comprise thermoplastic vulcanizates (TPV), such as Santoprene™. In embodiments, the encapsulation 106 comprises Santoprene™, ethylene-chlorotrifluoroethylene (ECTFE), fluoroethylene-propylene (FEP), polyvinylidene fluoride (PVDF), poly-vinylchloride (PVC), HALAR® ECTFE, TEFLON PFA, polyether ether ketone (PEEK), or combinations thereof. In an example, the encapsulation 106 comprises an 11 mm by 11 mm Santoprene™ layer. Although this example includes an 11 mm by 11 mm encapsulation 106, any other combination of size and temperature rating can be used without departing from the scope of the present disclosure.

In some embodiments, as depicted in FIGS. 2 and 3, the fiber optic cable 100 further comprises an additional filler material 109a/109b in the annular space 112. The layer of the additional filler material 109a/109b is termed a "belt layer" covering the FIMT 102. The additional filler material 109a/109b can have any suitable thickness. In embodiments, the additional filler material 109a/109b has a thickness of from about 0.001 inch to about 1 inch, alternatively from about 0.001 inch to about 0.5 inch, alternatively from about 0.001 inch to about 0.25 inch, or alternatively from about 0.001 inch to about 0.01 inch. The additional filler material 109a/109b can assist the cured gelling material in maintaining the FIMT 102 approximately centered within the outer tube 104.

In embodiments, referring to FIG. 2, the additional filler material 109a is adjacent to the outer surface 105 of the FIMT 102, forming a first sub-annular space 112a between the outer surface 111a of the additional filler material 109a and the inner surface 107 of the outer tube 104. The additional filler material 109a can form a cylindrical outer cover covering substantially about the outer surface 105 of the FIMT 102. The cured gelling material can be in the first sub-annular space 112a. The first sub-annular space 112a is a part of the annular space 112.

In some other embodiments, referring to FIG. 3, the additional filler material 109b is adjacent to the inner surface 107 of the outer tube 104, forming a second sub-annular space 112b between the inner surface 111b of the additional filler material 109b and the outer surface 105 of the FIMT 102. The additional filler material 109b can form a cylindrical inner cover covering substantially about the inner surface 107 of the outer tube 104. The cured gelling material can be in the second sub-annular space 112b. The second sub-annular space 112b is a part of the annular space 112.

In embodiments, the additional filler material 109a/109b comprises a filler polymer, a hydrogen barrier, grease compounds, foams, or a combination thereof.

In embodiments, the filler polymer is capable of protecting the FIMT 102 from damage that may result from vibration. The filler polymer can be formed by polymerizing monomers selected from imide, vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldehyde, acryloylmorpholine, and any combination thereof. In embodiments, the filler polymer comprises polypropylene, fluoro-ethylenepropylene (FEP), ethylene-chlorotrifluoroethylene (ECTFE), polyvinylidene fluoride (PVDF), perfluor alkoxy (PFA), TEFLON™ polytetrafluoroethylene (PTFE), TEFLON™ PFA, TEFZEL™ ethylene-tetrafluoroethylene (ETFE) resin, or combinations thereof.

In embodiments, the additional filler material 109a/109b comprises a hydrogen barrier. The hydrogen barrier can comprise a material capable of reducing hydrogen and/or radiation permeation through fiber optic cable 100. In embodiments, the hydrogen barrier comprises aluminum, carbon, silicon, germanium, tin, lead, lead hydride, gold, antimony, palladium, silicon oxy-nitride, a eutectic of these materials, or combinations thereof.

Although the examples show the inner tube 103, the additional filler material 109a/109b, the cured gelling material, the outer tube 104, and the encapsulation 106 without interstitial layers (e.g., an insulating layer), the fiber optic cable 100 can further comprise such interstitial layers without departing from the scope of the present disclosure.

Although not illustrated in FIGS. 1-3, the fiber optic cable 100 may further comprise a ripcord. The ripcord may be surrounding the outer tube 104 and in contact with an outer surface of the outer tube 104. In embodiments, at least a portion of the ripcord is encapsulated by the encapsulation 106 and is capable of cutting the encapsulation 106 by pulling the ripcord. The ripcord can comprise any suitable material and have any suitable shape and size.

In some embodiments, one or more of the fiber optic cable 100 can be encapsulated in the same bumper encapsulation, which substantially encapsulate the one or more of the fiber optic cable 100. The one or more of the fiber optic cable 100 sharing the same bumper encapsulation can also be referred to as bumper stranded cables or flatpak cables. The bumper encapsulation can comprise any suitable material and have any suitable shapes and sizes. Nonlimiting examples of suitable materials include polypropylene, Santoprene™, Nylon, PVDF, Tefzel™ ETFE (ethylene-tetrafluoroethylene), HALAR® ECTFE, FEP, PFA, and ECCtreme™ ECA 3000 fluoroplastic resin. The one or more of the fiber optic cable 100 can have contact points or not have contact points with each other. An additional ripcord can be surrounding the one or more of the fiber optic cable 100 and is capable of cutting the bumper encapsulation by pulling the additional ripcord. The additional ripcord can have similar material, shape, and/or size as the ripcord.

The fiber optic cable 100 can be made using any suitable methodologies. In embodiments, referring to FIG. 5, a method 300 of making the fiber optic cable 100 is disclosed. At block 302, the method 300 comprises forming the FIMT 102, which can use any of a variety of standard fiber optic cable manufacturing techniques.

Figure 5:
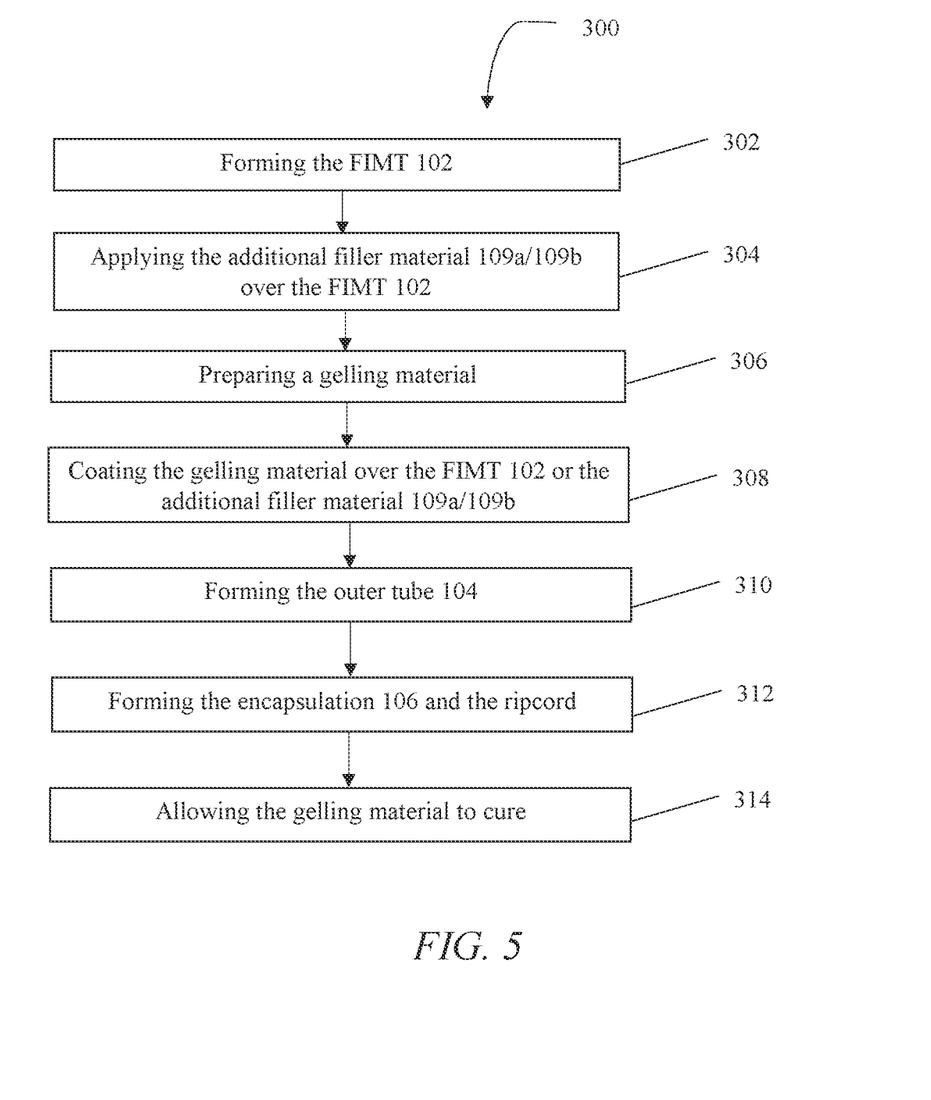
FIG. 5 is a flow chart of a method according to some embodiment of the disclosure.

At block 304, the method 300 comprises applying an additional filler material 109a/109b of the type disclosed herein over the FIMT 102. Block 304 is optional. In embodiments, block 304 comprises passing the FIMT 102 through a molten bath comprising a material for the additional filler material 109a/109b of the type disclosed herein, for example, a material or combination of materials capable of reducing and/or delaying hydrogen permeation through the fiber optic cable 100, or a melt filler polymer. The material of the molten bath can be in a form of a fluid such as a melt polymer. The temperature of the material of the molten bath can be any suitable temperature without departing from the scope of the present disclosure. In other embodiments, block 304 may include extruding an aluminum layer over the FIMT 102.

At block 306, the method 300 comprises preparing a gelling material as previously described in the present disclosure.

At block 308, the method 300 comprises coating the gelling material over the FIMT 102 or the additional filler material 109a/109b. In embodiments, coating the gelling material over the FIMT 102 or the additional filler material 109a/109b comprises extruding the gelling material over the FIMT 102 or the additional filler material 109a/109b. In the cases when the method does not include block 304, the gelling material can be coated (e.g., extruded) over the FIMT 102 as in FIG. 1. In the cases when the method includes block 304, the gelling material can be coated (e.g., extruded) over the FIMT 102 as in FIG. 3, or over the additional filler material 109a/109b as in FIG. 2. Any suitable equipment can be used for coating. In embodiments, an extruder can be used for extruding. Extruding the gelling material can comprise introducing the prepared gelling material into an extruder and guiding (e.g., pulling) the FIMT 102 through the extruder.

At block 310, the method 300 comprises forming the outer tube 104. Forming the outer tube 104 can use any of a variety of standard fiber optic cable manufacturing techniques. In some embodiments, the prepared gelling material is introduced in an uncured liquid form in the annular space 112 as the outer tube 104 is being formed. Introducing the gelling material can be in a similar way to how the inner filler material 110 is introduced in the FIMT 102 during its manufacturing in block 302. The gelling material can be introduced in the fiber optic cable 100 in block 308, block 310, or both.

At block 312, the method 300 optionally comprises forming the encapsulation 106 and the ripcord. Forming the encapsulation 106 and the ripcord can use any of a variety of standard fiber optic cable manufacturing techniques.

At block 314, the method 300 comprises allowing the gelling material to cure. The curing time has been previously described in the present disclosure. During the curing time, the fiber optic cable 100 can be spooled on a cable reel or drum, the axis of which is horizontal so that loops of the fiber optic cable 100 are on vertical plane(s). In embodiments, the cable reel or drum is held stable during curing, so that periodic sections in the annular space 112 of the fiber optic cable 100 can have 100% fill percentage of the gelling material because of gravity. Alternatively, the cable reel or drum can be continuously rotated during curing, so that the distribution of gelling material in the annular space 112 of the fiber optic cable 100 is uniform along the fiber optic cable 100. Another alternative is to rest the cable reel on its flange so that the plane each loop of the fiber optic cable 100 lies on is about horizontal, which can result in a distribution of cured gelling material similar to the rotating method described above. In some embodiments, at least a part of the curing occurs after the fiber optic cable 100 is placed in a wellbore.

Besides composition and curing time of the gelling material, cable manufacturers can adjust various other process parameters to achieve desired thickness and/or properties of the cured gelling material. For example, cable manufacturers can adjust the temperature of the curing, the rate of guiding the FIMT 102 through the extruder, the rate at which the FIMT 102 passes through the molten bath, the temperature of the material of the molten bath, and the length of the molten bath to achieve desired results. In various embodiments, the temperature of the material of the molten bath can be manipulated by combining the desired material with eutectics of that material. For example, if the material of the molten bath comprises lead, then a cable manufacturer could add tin to the molten bath to manipulate the melting point of lead.

In various embodiments, the fiber optic cable 100 is capable of conveying signals (e.g., optical signals, electrical signals) between one or more sensors and/or equipment within a downhole environment and instrumentation outside the downhole environment. The downhole environment can be in a wellbore penetrating at least a portion of a subterranean formation. The one or more sensors can be distributed along all or a portion of the wellbore. The one or more sensors and/or equipment can comprise the fiber optic cable 100, an additional sensor and/or equipment, or combinations thereof. The additional sensor and/or equipment can comprise measurement while drilling (MWD), logging while drilling (LWD) instruments, detectors, circuits, or other equipment that provide information about the wellbore and/or formation, such as logging or measurement data from the wellbore. In embodiments when the one or more sensors and/or equipment comprise the fiber optic cable 100, the fiber optic cable 100 is coupled at one end to the instrumentation outside the downhole environment, and is capable of conveying signals between the other end of the fiber optic cable 100 and the instrumentation outside the downhole environment; at least a portion of the fiber optic cable 100 operates as a sensing element.

In embodiments, a distributed acoustic sensing (DAS) system comprises the fiber optic cable 100 disclosed herein.

Figure 4:
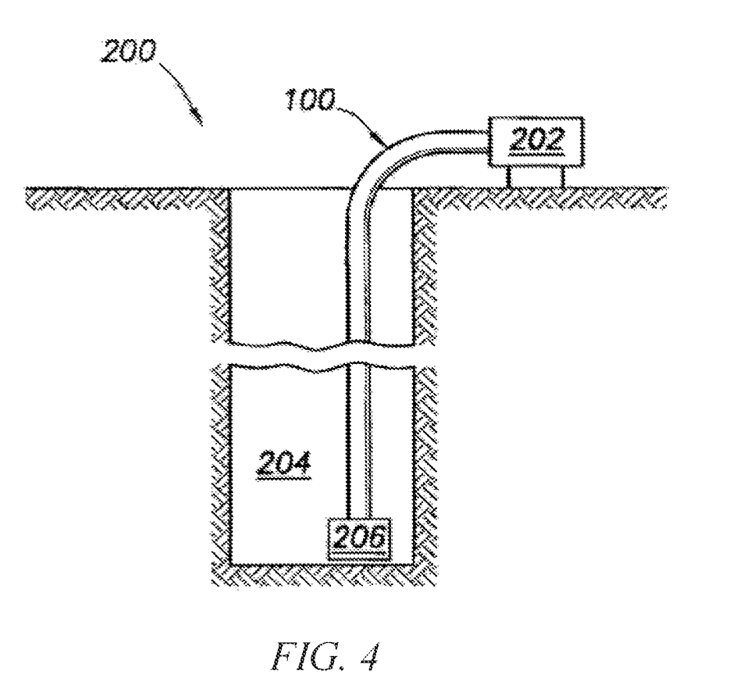
FIG. 4 is a block diagram illustrating using the fiber optic cable in a downhole environment.

In some embodiments, the DAS system can further comprise a data handling system. FIG. 4 is a block diagram illustrating a DAS system 200 of the type disclosed herein in a wellbore 204. The fiber optic cable 100 can be extended (e.g., pumped) into the wellbore 204. In some embodiments, the fiber optic cable 100 is pulled into the wellbore 204 by fluid action pushing on a dart attached to the end of the fiber optic cable 100. In embodiments, the DAS system 200 includes a data handling system 202 at a surface location outside of the wellbore 204. The data handling system 202 may be capable of monitoring one or more well parameters associated with the wellbore 204. In embodiments, the one or more well parameters comprise a temperature, a pressure, chemical concentration, pH, strain (static or dynamic), a flow of fluids (e.g., flow rate), or combinations thereof. In some embodiments, the data handling system 202 may be capable of sending signals to one or more sensors and/or equipment located within the wellbore 204. The data handling system 202 can comprise, for example, any combination of hardware, software, and/or firmware that is capable of performing a desired functionality. In embodiments, the data handling system 202 comprises a light source, such as a laser, and an interrogator to detect return light.

The one or more optical fibers 108 can sense the one or more well parameters along all or a portion of the wellbore and transmit a signal (e.g., a signal representing the one or more sensed well parameters) to the data handling system 202. For example, the one or more optical fibers 108 can sense a temperature profile of the wellbore 204, a strain, or a combination of these or other parameters, and transmit a signal of the sensed parameter to the data handling system 202. In other embodiments, the data handling system 202 can send a signal to the one or more optical fibers 108, which can transmit the signal along same. In embodiments, the DAS system 200 further comprises an additional sensor and/or equipment 206. The additional sensor and/or equipment 206 can sense the one or more well parameters along at least a portion of the wellbore and the one or more optical fibers 108 can transmit a signal (e.g., a signal representing the one or more sensed well parameters) to the data handling system 202. In other embodiments, the one or more optical fibers 108 can transmit a signal from the data handling system 202 to the additional sensor and/or equipment 206.

Although one fiber optic cable 100 is illustrated in FIG. 4, one or more of the fiber optic cable 100 and optionally one or more of the additional sensors and/or equipment 206 can be included in the DAS system 200. In embodiments, the one or more of the fiber optic cable 100 have different lengths. The one or more of the fiber optic cable 100 can extend to different locations in the wellbore. In embodiments, bumper stranded cables (e.g. flatpak cables strapped on casing) with one or more of the fiber optic cable 100 can be used.

Disclosed herein is a method of using a DAS system. The method can comprise extending the fiber optic cable 100 into a wellbore, sensing one or more well parameters with the one or more optical fibers 108, and transmitting a signal over the one or more optical fibers 108 to a surface location (e.g., a data handling system) of the wellbore. Sensing one or more well parameters can be along all or a portion of the wellbore. The wellbore can comprise a $CO_2$ capture and/or storage zone. $CO_2$ capture and storage, also referred to as carbon capture and storage (CCS) or carbon capture and sequestration, is the process of capturing $CO_2$ before it enters the atmosphere, transporting it, and storing it for centuries or millennia. Storage of the $CO_2$ can be in deep geological formations, such as a $CO_2$ capture and/or storage zone in a downhole environment. In embodiments, the wellbore has a bottomhole static temperature (BHST) temperature in a range of from about 50° F. to about 450° F., alternatively from about 50° F. to about 400° F., or alternatively from about 50° F. to about 350° F.

Disclosed herein is a method comprising: providing a fiber optic cable 100 of the type disclosed herein, disposing the fiber optic cable 100 in a downhole environment, and transmitting a signal over the one or more optical fibers 108. Also disclosed herein is a method comprising: providing a fiber optic cable 100 of the type disclosed herein, wherein the fiber optic cable 100 is disposed along a length of a conduit; and performing distributed acoustic sensing (DAS) along the length of the conduit by transmitting acoustic signals using the fiber optic cable 100. The conduit, such as casing, can be in a wellbore penetrating a subterranean formation. The wellbore can comprise a $CO_2$ capture and/or storage zone.

Various benefits may be realized by utilization of the presently disclosed fiber optic cable and methods. By incorporating the cured gelling material into the annular space 112 between the outer surface 105 of the FIMT 102 and the inner surface 107 of the outer tube 104, fluid migration through the annular space 112 can be reduced, and interfacial sheer stress for strain coupling of the FIMT 102 and the outer tube 104 can be increased.

In an aspect, the presently disclosed fiber optic cable can be used with acoustic emitters that produce acoustic energy as fluid flows through or across the emitters. For example, a well completion may have these acoustic emitters positioned at known locations in the wellbore where the acoustic energy is detected with an optical distributed acoustic sensing (DAS) system, with an optical line of the type disclosed herein closely collocated with and/or coupled to the emitters.

Potential applications can include completions where liquids and/or gases are injected or produced through a controlled flow path at each of multiple locations. Injection examples include steam injection in steam assisted gravity drainage (SAGD) wells where steam is injected at multiple spaced apart locations simultaneously, enhanced oil recovery (EOR) applications with gas injection, matrix acidizing where an injection pressure is less that formation fracture pressure and determining flow distribution to different zones is a challenge, fluid diversion and conformance treatments, and water alternating gas (WAG) injections where there are multiple injection points from a common tubular string and it is desired to know a flow rate at each specific injection location. Using the principles of this disclosure, an inexpensive fit for purpose flow rate sensing system can be incorporated into an intelligent completion and/or any completion or other well installation that can accommodate the optical line of the type disclosed herein and one or more acoustic emitters.

The acoustic emitters can be made from erosion resistant materials and can be selected or configured for particular expected flow rates. The emitters can have specially configured channels with flow areas selected to control fluid flow velocity and flow regime, such that the DAS system can be used to determine flow rate based on the acoustic energy transmitted to the optical line (e.g., fiber optic of the type disclosed herein).

The acoustic emitters can be configured so that they direct flow past acoustic signal generators. The flow can create acoustic energy that can be coupled to an optical waveguide (e.g., fiber optic cable of the type disclosed herein) interrogated by a DAS interrogator. Varying flow rates and/or multiple emitters may create a flow rate dependent acoustic emission that is indicative of the flow rate.

An acoustic emitter can be made with a number of different cavities designed to generate acoustic energy. Different cavities may be activated, and/or sizes of different cavities may be changed, based on the expected fluid flow rates. The cavities can be similar to flutes and/or whistles.

An emitter can be configured to direct flow through selected channels with certain flow areas to keep the flow velocity within a desired range of Reynolds numbers for a desired flow regime. The optical line (e.g., fiber optic cable of the type disclosed herein) can also be placed in this channel to be directly exposed to the flow. The flow would then generate acoustic energy that can be used to detect flow rate and the fiber optic cable can transmit a signal associated with the detected flow rate.

ADDITIONAL DISCLOSURE

The following is provided as additional disclosure for combinations of features and embodiments of the present disclosure.

A first embodiment, which is a fiber optic cable (100), comprising: an outer tube (104) having an inner surface (107) and an outer surface; a fiber in metal tube (FIMT) (102) comprising one or more optical fibers (108), wherein the FIMT (102) is disposed within the outer tube (104), and wherein the outer surface (105) of the FIMT (102) and the inner surface (107) of the outer tube (104) form an annular space (112); and a cured gelling material in the annular space (112).

A second embodiment, which is the fiber optic cable (100) of the first embodiment, wherein the cured gelling material comprises a biopolymer, a synthetic polymer, or a combination thereof.

A third embodiment, which is the fiber optic cable (100) of the first or the second embodiment, wherein the cured gelling material comprises a silicone component, an epoxy resin, polyurethanes (PUs), thermoplastic polyurethanes (TPUs), thermoplastic vulcanizates (TPVs), polyether ester block copolymers (COPEs), thermoplastic polyamides (COPAs), silicone containing thermoplastic elastomers, fluorine containing thermoplastic elastomers, phenolics, cyanate ester based resins, high temperature resistant thermoplastics, polyetherimides, polyphenylene ether, polyoxyphenylenes, polysulphone, syndiotactic polystyrene, polyaryl ether ketones, polycarbonates, acetals, polyimides, polyarylene sulfides, polyurethane based compositions, natural rubber, ethylene/propylene (EPM) copolymers, ethylene/propylene/diene (EPDM) copolymers, styrene/butadiene copolymers, chlorinated polyethylene, vinylic resins, cycloaliphatic epoxy resins, nitrogen containing resins, or combinations thereof.

A fourth embodiment, which is the fiber optic cable (100) of any of the first through the third embodiments, wherein the cured gelling material comprises a silicone component, an epoxy resin, or a combination thereof.

A fifth embodiment, which is the fiber optic cable (100) of the third or the fourth embodiment, wherein the silicone component comprises a silicone resin.

A sixth embodiment, which is the fiber optic cable (100) of any of the third through the fifth embodiments, wherein the silicone component comprises two or more silicone reactive moieties independently selected from the group consisting of epoxy, hydroxy, olefinic, hydride, isocyanate, acrylate, acetoxy, enoxy, oxime, alkoxy, amine, amide groups, derivatives thereof, and combinations thereof.

A seventh embodiment, which is the fiber optic cable (100) of any of the third through the sixth embodiments, wherein the silicone component has a weight average molecular weight of from about 1,000 to about 10,000.

An eighth embodiment, which is the fiber optic cable (100) of any of the third through the seventh embodiments, wherein the epoxy resin comprises two or more epoxy reactive moieties independently selected from the group consisting of epoxide, oxirane, ethylene carbonate, alcohol, amine, derivatives thereof, and combinations thereof.

A ninth embodiment, which is the fiber optic cable (100) of any of the third through the eighth embodiments, wherein the epoxy resin has a weight average molecular weight of from about 100 to about 10,000.

A tenth embodiment, which is the fiber optic cable (100) of any of the first through the ninth embodiments, wherein the cured gelling material is crosslinked.

An eleventh embodiment, which is the fiber optic cable (100) of any of the first through the tenth embodiments, wherein the cured gelling material is in a form of gel.

A twelfth embodiment, which is the fiber optic cable (100) any of the first through the eleventh embodiment, wherein a sheer stress provided by an internal friction is about 1 to about 1,000 times of a sheer stress provided by frictions.

A thirteenth embodiment, which is the fiber optic cable (100) of any of the first through the twelfth embodiments, wherein the annular space (112) has a thickness of from about 0.001 inch to about 1 inch.

A fourteenth embodiment, which is the fiber optic cable (100) of any of the first through the thirteenth embodiments, wherein fill percentage of the cured gelling material is from about 25% to about 100%, based on the total volume of the annular space (112).

A fifteenth embodiment, which is the fiber optic cable (100) of any of the first through the fourteenth embodiments, wherein the cured gelling material is capable to reduce a flow of a fluid through the annular space (112) over a distance of equal to or less than about 50 ft along an axial direction.

A sixteenth embodiment, which is the fiber optic cable (100) of the fifteenth embodiment, wherein the fluid comprises $CO_2$, $H_2$, $H_2O$, $N_2$, $O_2$, CO, $NH_3$, $H_2S$, $SO_2$, hydrocarbon, or combinations thereof.

A seventeenth embodiment, which is the fiber optic cable (100) of any of the first through the sixteenth embodiments, wherein the FIMT (102) has an outside diameter (OD) of from about 0.01 inch to about 2.5 inches.

An eighteenth embodiment, which is the fiber optic cable (100) of any of the first through the seventeenth embodiments, wherein the FIMT (102) further comprises an inner tube (103) having an inner surface (115), wherein the one or more optical fibers (108) are disposed within the inner tube (103).

A nineteenth embodiment, which is the fiber optic cable (100) of the eighteenth embodiment, wherein the inner tube (103) comprises a conductor.

A twentieth embodiment, which is the fiber optic cable (100) of the eighteenth or the nineteenth embodiment, wherein the inner tube (103) comprises a material comprising stainless steel, copper, aluminum, Inconel® alloy, incoloy® alloy, or combinations thereof.

A twenty-first embodiment, which is the fiber optic cable (100) of any of the eighteenth through the twentieth embodiments, wherein the inner tube (103) has a thickness of from about 0.0001 inch to about 1 inch.

A twenty-second embodiment, which is the fiber optic cable (100) of any of the first through the twenty-first embodiments, wherein the number of the one or more optical fibers (108) is from 1 to about 10,000.

A twenty-third embodiment, which is the fiber optic cable (100) of any of the first through the twenty-second embodiments, wherein the one or more optical fibers (108) has an OD of from about 10 μm to about 2,000 μm.

A twenty-fourth embodiment, which is the fiber optic cable (100) of any of the nineteenth through the twenty-third embodiments, wherein the FIMT (102) further comprises an inner filler material (110) disposed between the outer surfaces of the one or more optical fibers (108) and the inner surface (115) of the inner tube (103).

A twenty-fifth embodiment, which is the fiber optic cable (100) of the twenty-fourth embodiment, wherein the inner filler material (110) comprises a hydrogen absorptive material.

A twenty-sixth embodiment, which is the fiber optic cable (100) of any of the twenty-fourth through the twenty-fifth embodiments, wherein the inner filler material (110) comprises the same material as the cured gelling material.

A twenty-seventh embodiment, which is the fiber optic cable (100) of any of the twenty-fourth through the twenty-sixth embodiments, wherein the inner filler material (110) comprises a thixotropic gel, a hydrophobic gel, a hydrogen scavenging gel, grease compounds, foams, or combinations thereof.

A twenty-eighth embodiment, which is the fiber optic cable (100) of any of the twenty-fourth through the twenty-seventh embodiments, wherein the inner filler material (110) substantially encapsulates the one or more optical fibers (108).

A twenty-ninth embodiment, which is the fiber optic cable (100) of any of the twenty-fourth through the twenty-eighth embodiments, wherein fill percentage of the inner filler material (110) is from about 50% to about 100%, based on the total volume of the space between the outer surfaces of the one or more optical fibers (108) and the inner surface (115) of the inner tube (103).

A thirtieth embodiment, which is the fiber optic cable (100) of any of the first through the twenty-ninth embodiments, wherein the outer tube (104) comprises a material comprising stainless steel, copper, aluminum, Inconel® alloy, incoloy® alloy, or combinations thereof.

A thirty-first embodiment, which is the fiber optic cable (100) of any of the first through the thirtieth embodiments, wherein the outer tube (104) has an inner diameter (ID) in a range of from about 0.001 inch to about 3 inches.

A thirty-second embodiment, which is the fiber optic cable (100) of any of the first through the thirty-first embodiments, wherein the fiber optic cable (100) further comprises an aluminum layer disposed on the outer surface (105) of the FIMT (102).

A thirty-third embodiment, which is the fiber optic cable (100) of any of the first through the thirty-second embodiments, wherein the outer tube (104) has a thickness of from about 0.001 inch to about 1 inch.

A thirty-fourth embodiment, which is the fiber optic cable (100) of any of the first through the thirty-third embodiments, further comprising an encapsulation (106).

A thirty-fifth embodiment, which is the fiber optic cable (100) of the thirty-fourth embodiment, wherein the encapsulation (106) comprises a thermoplastic elastomer.

A thirty-sixth embodiment, which is the fiber optic cable (100) of the thirty-fifth embodiment, wherein the thermoplastic elastomer comprises thermoplastic vulcanizates (TPV).

A thirty-seventh embodiment, which is the fiber optic cable (100) of any of the thirty-fourth through the thirty-sixth embodiments, wherein the encapsulation (106) comprises Santoprene™, ethylene-chlorotrifluoroethylene (ECTFE), fluoroethylene-propylene (FEP), polyvinylidene fluoride (PVDF), poly-vinylchloride (PVC), HALAR® ECTFE, TEFLON PFA, poly ether ether keytone (PEEK), or combinations thereof.

A thirty-eighth embodiment, which is the fiber optic cable (100) of any of the first through the thirty-seventh embodiments, further comprising an additional filler material (109a/109b) in the annular space (112).

A thirty-ninth embodiment, which is the fiber optic cable (100) of the thirty-eighth embodiment, wherein the additional filler material (109a/109b) has a thickness of from about 0.001 inch to about 1 inch.

A fortieth embodiment, which is the fiber optic cable (100) of the thirty-eighth or the thirty-ninth embodiment, wherein the additional filler material (109a) is adjacent to the outer surface (105) of the FIMT (102), forming a first sub-annular space (112a) between the outer surface (111a) of the additional filler material (109a) and the inner surface (107) of the outer tube (104).

A forty-first embodiment, which is the fiber optic cable (100) of the fortieth embodiment, wherein the additional filler material (109a) forms a cylindrical outer cover covering substantially about the outer surface (105) of the FIMT (102).

A forty-second embodiment, which is the fiber optic cable (100) of the fortieth or the forty-first embodiment, wherein the cured gelling material is in the first sub-annular space (112a).

A forty-third embodiment, which is the fiber optic cable (100) of the thirty-eighth or the thirty-ninth embodiment, wherein the additional filler material (109b) is adjacent to the inner surface (107) of the outer tube (104), forming a second sub-annular space (112b) between the inner surface (111b) of the additional filler material (109b) and the outer surface (105) of the FIMT (102).

A forty-fourth embodiment, which is the fiber optic cable (100) of the forty-third embodiment, wherein the additional filler material (109b) forms a cylindrical inner cover covering substantially about the inner surface (107) of the outer tube (104).

A forty-fifth embodiment, which is the fiber optic cable (100) of the forty-third or the forty-fourth embodiment, wherein the cured gelling material is in the second sub-annular space (112b).

A forty-sixth embodiment, which is the fiber optic cable (100) of any of the thirty-eighth through the forty-fifth embodiments, wherein the additional filler material (109a/109b) comprises a filler polymer, a hydrogen barrier, grease compounds, foams, or a combination thereof.

A forty-seventh embodiment, which is the fiber optic cable (100) of the forty-sixth embodiment, wherein the filler polymer is formed by polymerizing monomers selected from imide, vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2 (1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldehyde, acryloylmorpholine, and any combination thereof.

A forty-eighth embodiment, which is the fiber optic cable (100) of the forty-sixth embodiment, wherein the filler polymer comprises polypropylene, fluoro-ethylenepropylene (FEP), ethylene-chlorotrifluoroethylene (ECTFE), polyvinylidene fluoride (PVDF), perfluor alkoxy (PFA), TEFLON™ polytetrafluoroethylene (PTFE), TEFLON™ PFA, TEFZEL™ ethylene-tetrafluoroethylene (ETFE) resin, or combinations thereof.

A forty-ninth embodiment, which is the fiber optic cable (100) of any of the forty-sixth through the forty-eighth embodiments, wherein the hydrogen barrier comprises a material capable of reducing hydrogen and/or radiation permeation through fiber optic cable (100).

A fiftieth embodiment, which is the fiber optic cable (100) of any of the forty-sixth through the forty-ninth embodiments, wherein the hydrogen barrier comprises aluminum, carbon, silicon, germanium, tin, lead, lead hydride, gold, antimony, palladium, silicon oxy-nitride, a eutectic of these materials, or combinations thereof.

A fifty-first embodiment, which is the fiber optic cable (100) of any of the first through the fiftieth embodiments, wherein the storage modulus of the cured gelling material at about 75° F. is from about 5 kPa to about 300 kPa.

A fifty-second embodiment, which is the fiber optic cable (100) of any of the first through the fifty-first embodiments, wherein the viscosity of the cured gelling material before curing at about 75° F. is equal to or less than about 50,000 cp.

A fifty-third embodiment, which is the fiber optic cable (100) of any of the first through the fifty-second embodiments, wherein the cured gelling material is a thermally stable gel at a temperature ranging from about 50° F. to about 450° F.

A fifty-fourth embodiment, which is the fiber optic cable (100) of any of the first through the fifty-third embodiments, wherein the dielectric constant of the cured gelling material is from about 2 to about 3.5, at about 20 Hz to about 100 kHz and about 70° F. to about 300° F.

A fifty-fifth embodiment, which is the fiber optic cable (100) of any of the first through the fifty-fourth embodiments, wherein the hardness penetration of the cured gelling material is from about 30 mm/10 to about 80 mm/10.

A fifty-sixth embodiment, which is the fiber optic cable (100) of any of the first through the fifty-fifth embodiments, wherein the specific density of the cured gelling material is from about 0.8 g/cm$^3$ to about 2.0 g/cm$^3$.

A fifty-seventh embodiment, which is the fiber optic cable (100) of any of the first through the fifty-sixth embodiments, wherein the thermal conductivity of the cured gelling material is from about 0.1 W/mK to about 7 W/mK.

A fifty-eighth embodiment, which is the fiber optic cable (100) of any of the first through the fifty-seventh embodiments, wherein the linear thermal expansion coefficient of the cured gelling material is from about 2E-5 m/mK to about 8E-4 m/mK.

A fifty-ninth embodiment, which is a method of making the fiber optic cable (100) of any of the first through the fifty-eighth embodiments, comprising: forming the FIMT (102); preparing a gelling material comprising two or more reactive groups and a catalyst; coating the gelling material over the FIMT (102); forming the outer tube (104); and allowing the gelling material to cure.

A sixtieth embodiment, which is the method of the fifty-ninth embodiment, further comprising applying the additional filler material (109a/109b) over the FIMT (102), prior to preparing the gelling material.

A sixty-first embodiment, which is the method of the fifty-ninth or the sixtieth embodiment, further comprising forming an encapsulation (106) and a ripcord, prior to allowing the gelling material to cure.

A sixty-second embodiment, which is the method of any of the fifty-ninth through the sixty-first embodiments, wherein the curing time of the gelling material is from about 1 minute to about 48 hours at about 74° F.

A sixty-third embodiment, which is the method of any of the fifty-ninth through the sixty-second embodiments, wherein the curing time of the gelling material is from about 1 hour to about 48 hours at about 74° F.

A sixty-fourth embodiment, which is the method of any of the fifty-ninth through the sixty-third embodiments, wherein the gelling material further comprises at least one of a hardener, an inorganic filler, a fibrous reinforcement, a high temperature resistant thermoplastic resin, and a solvent.

A sixty-fifth embodiment, which is the method of any of the fifty-ninth through the sixty-fourth embodiments, wherein the gelling material further comprises additives.

A sixty-sixth embodiment, which is the method of any of the fifty-ninth through the sixty-fifth embodiments, wherein the gelling material further comprises a retarder.

A sixty-seventh embodiment, which is the method of the sixty-sixth embodiment, wherein the retarder comprises a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, derivatives thereof, or combinations thereof.

A sixty-eighth embodiment, which is a distributed acoustic sensing (DAS) system comprising the fiber optic cable (100) of any of the first through the sixty-seventh embodiments.

A sixty-ninth embodiment, which is the DAS system of the sixty-eighth embodiment, further comprising a data handling system.

A seventieth embodiment, which is a method of using the DAS system of the sixty-eighth embodiment or the sixty-ninth embodiment, comprising: extending the fiber optic cable (100) into a wellbore, sensing one or more well parameters with the one or more optical fibers (108), and transmitting a signal of same over the one or more optical fibers (108) to a surface location of the wellbore.

A seventy-first embodiment, which is the method of the seventieth embodiment, wherein sensing one or more well parameters is along all or a portion of the wellbore.

A seventy-second embodiment, which is the method of any of the seventieth through the seventy-first embodiments, wherein the wellbore comprises a $CO_2$ capture and/or storage zone.

A seventy-third embodiment, which is the method of any of the seventieth through the seventy-second embodiments, wherein the wellbore has a bottomhole static temperature (BHST) temperature in a range of from about 50° F. to about 450° F.

A seventy-fourth embodiment, which is the method of any of the seventieth through the seventy-third embodiments, wherein the one or more sensed well parameters comprise chemical concentration, pH, a temperature, a pressure, strain, a flow of fluids, or combinations thereof.

A seventy-fifth embodiment, which is a method comprising: providing a fiber optic cable (100) comprising: an outer tube (104) having an inner surface (107) and an outer surface; a fiber in metal tube (FIMT) (102) comprising one or more optical fibers (108), wherein the FIMT (102) is disposed within the outer tube (104), and wherein the outer surface (105) of the FIMT (102) and the inner surface (107) of the outer tube (104) form an annular space (112); and a cured gelling material in the annular space (112); disposing the fiber optic cable (100) in a downhole environment; and transmitting a signal over the one or more optical fibers (108).

A seventy-sixth embodiment, which is a method comprising: providing a fiber optic cable (100) disposed along a length of a conduit, wherein the fiber optic cable (100) comprises: an outer tube (104) having an inner surface (107) and an outer surface; a fiber in metal tube (FIMT) (102) comprising one or more optical fibers (108), wherein the FIMT (102) is disposed within the outer tube (104), and wherein the outer surface (105) of the FIMT (102) and the inner surface (107) of the outer tube (104) form an annular space (112); and a cured gelling material in the annular space (112); and performing distributed acoustic sensing (DAS) along the length of the conduit by transmitting acoustic signals using the fiber optic cable (100).

A seventy-seventh embodiment, which is the method of the seventy-sixth embodiment, wherein the conduit is in a wellbore penetrating a subterranean formation.

A seventy-eighth embodiment, which is the method of seventy-seventh embodiment, wherein the wellbore comprises a $CO_2$ capture and/or storage zone.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k* (R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A fiber optic cable, comprising:
an outer tube having an inner surface and an outer surface;
a fiber in metal tube (FIMT) comprising one or more optical fibers,
wherein the FIMT is disposed within the outer tube, and
wherein the outer surface of the FIMT and the inner surface of the outer tube form an annular space; and
a cured gelling material and an additional filler in the annular space, wherein the cured gelling material is crosslinked, wherein the cured gelling material reduces fluid migration through the annular and wherein the additional filler material comprises a filler polymer, a hydrogen barrier, a grease compound, a foam, or a combination thereof,
wherein the filler polymer is formed by polymerizing monomers selected from imide, vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allylamines, N-vinyl-3(E)-ethylidene pyrrolidone, ethylidene bis (N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldehyde, acryloylmorpholine, or a combination thereof, and
wherein the hydrogen barrier comprises a material capable of reducing hydrogen and/or radiation permeation through fiber optic cable.

2. The fiber optic cable of claim 1, wherein the cured gelling material comprises a biopolymer, a synthetic polymer, or a combination thereof.

3. The fiber optic cable of claim 1, wherein the cured gelling material comprises a silicone component, an epoxy resin, polyurethanes (PUs), thermoplastic polyurethanes (TPUs), thermoplastic vulcanizates (TPVs), polyether ester block copolymers (COPEs), thermoplastic polyamides (COPAs), silicone containing thermoplastic elastomers, fluorine containing thermoplastic elastomers, phenolics, cyanate ester based resins, high temperature resistant thermoplastics, polyetherimides, polyphenylene ether, polyoxyphenylenes, polysulphone, syndiotactic polystyrene, polyaryl ether ketones, polycarbonates, acetals, polyimides, polyarylene sulfides, polyurethane based compositions, natural rubber, ethylene/propylene (EPM) copolymers, ethylene/propylene/diene (EPDM) copolymers, styrene/butadiene copolymers, chlorinated polyethylene, vinylic resins, cycloaliphatic epoxy resins, nitrogen containing resins, or combinations thereof.

4. The fiber optic cable of claim 1, wherein the cured gelling material comprises a silicone component, an epoxy resin, or a combination thereof.

5. The fiber optic cable of claim 3, wherein the silicone component comprises two or more silicone reactive moieties independently selected from the group consisting of epoxy, hydroxy, olefinic, hydride, isocyanate, acrylate, acetoxy, enoxy, oxime, alkoxy, amine, amide groups, derivatives thereof, and combinations thereof.

6. The fiber optic cable of claim 1, wherein the cured gelling material is in a form of gel.

7. The fiber optic cable of claim 1, wherein fill percentage of the cured gelling material is from about 25% to about 100%, based on the total volume of the annular space.

8. The fiber optic cable of claim 1, wherein the cured gelling material is capable to reduce a flow of a fluid through the annular space over a distance of equal to or less than about 50 ft along an axial direction.

9. The fiber optic cable of claim 1, wherein the FIMT further comprises an inner tube having an inner surface, wherein the one or more optical fibers are disposed within the inner tube.

10. The fiber optic cable of claim 9, wherein the FIMT further comprises an inner filler material disposed between the outer surfaces of the one or more optical fibers and the inner surface of the inner tube.

11. The fiber optic cable of claim 1, wherein the additional filler material is adjacent to the outer surface of the FIMT, forming a first sub-annular space between the outer surface of the additional filler material and the inner surface of the outer tube.

12. The fiber optic cable of claim 1, wherein the additional filler material is adjacent to the inner surface of the outer tube, forming a second sub-annular space between the inner surface of the additional filler material and the outer surface of the FIMT.

13. The fiber optic cable of claim 1 further comprising an aluminum layer disposed on the outer surface of the FIMT.

14. The fiber optic cable of claim 3, wherein the thermoplastic elastomer comprises the thermoplastic vulcanizates (TPV).

15. The fiber optic cable of claim 3, wherein the silicone component has a weight average molecular weight of from about 1,000 to about 10,000.

16. The fiber optic cable of claim 1, wherein the filler polymer comprises polypropylene, fluoro-ethylenepropylene (FEP), ethylene-chlorotrifluoroethylene (ECTFE), polyvinylidene fluoride (PVDF), perfluor alkoxy (PFA), polytetrafluoroethylene (PTFE), ethylene-tetrafluoroethylene (ETFE) resin, or a combination thereof.

17. The fiber optic cable of claim 16, wherein the hydrogen barrier comprises aluminum, carbon, silicon, germanium, tin, lead, lead hydride, gold, antimony, palladium, silicon oxy-nitride, a eutectic thereof, or a combination thereof.

18. The fiber optic cable of claim 1, wherein the cured gelling material is cured from a gelling material comprising two or more reactive groups and a catalyst.

19. The fiber optic cable of claim 1, wherein the gelling material comprises a retarder selected from phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, or derivatives thereof.

20. The fiber optic cable of claim 1 wherein the additional filler material comprises the grease.

21. The fiber optic cable of claim 1 wherein the additional filler material comprises the foam.

\* \* \* \* \*